United States Patent [19]

Hasson et al.

[11] Patent Number: 5,102,591
[45] Date of Patent: Apr. 7, 1992

[54] METHOD FOR REMOVING VOLATILE SUBSTANCES FROM POLYPHENYLENE ETHER RESIN BLENDS

[75] Inventors: Alexandros Hasson, Feura Bush; Raymond J. Gerhart, Slingerlands, both of N.Y.

[73] Assignee: General Electric Company, Selkirk, N.Y.

[21] Appl. No.: 457,387

[22] Filed: Dec. 27, 1989

[51] Int. Cl.$^5$ .................... B29C 47/76; C08L 71/12
[52] U.S. Cl. .................... 264/45.9; 264/50; 264/53; 264/101; 264/102; 264/143; 264/211.23; 264/321; 525/132; 525/905
[58] Field of Search ............... 264/101, 102, 143, 50, 264/53, 211.23, 321, 45.9; 525/132, 905

[56] References Cited

U.S. PATENT DOCUMENTS

| | | | |
|---|---|---|---|
| 3,633,880 | 1/1972 | Nemark | 259/191 |
| 3,742,093 | 6/1973 | Skidmore | 260/893 |
| 4,369,278 | 1/1983 | Kasahara et al. | 534/147 |
| 4,504,338 | 3/1985 | Ives | 156/79 |
| 4,746,482 | 5/1988 | Ribbing et al. | 264/102 |
| 4,806,297 | 2/1989 | Brown et al. | 264/102 |
| 4,831,115 | 5/1989 | Golba, Jr. et al. | 528/481 |
| 4,992,222 | 2/1991 | Banevicius et al. | 264/143 |

*Primary Examiner*—Jacob Ziegler
*Attorney, Agent, or Firm*—Hedman, Gibson & Costigan

[57] ABSTRACT

A method for removing volatile substances from polyphenylene ether (PPE) resin blends in an extruder comprising adding a second thermoplastic resin downstream from the PPE feedport and one stage of water injection followed by vacuum venting is disclosed.

46 Claims, 1 Drawing Sheet

METHOD FOR REMOVING VOLATILE SUBSTANCES FROM POLYPHENYLENE ETHER RESIN BLENDS

This invention relates to the substantial removal of volatile substances from polyphenylene ether resin blends. More particularly the present invention relates to reducing the concentration of volatile substances from polyphenylene ether resin blends by extruding with multiple stages of water injection followed by vacuum venting and the addition of the second thermoplastic resins downstream of the polyphenylene ether feed.

BACKGROUND OF THE INVENTION

Polyphenylene ethers are a class of polymers which are widely used in industry, especially as engineering plastics in applications which require such properties as toughness and heat resistance. For many such applications polyphenylene ether resins are blended with various types of polystyrene resins to improve their processability. Recently it has become necessary to produce such compositions which are both substantially odorless and tasteless for food contact applications. It is therefore necessary that the polyphenylene ether resin blend composition be substantially free from any volatile materials which have undesirable odors or would otherwise harm the food. Materials of this kind which are known to be present in polyphenylene ether resin blends include toluene, dialkylamines such as di-n-butylamine, which are components of the catalyst used in preparing polyphenylene ether resins; and volatiles from second thermoplastic resins such as styrene monomers from degradation of any styrene resin; and other by-products resulting from polyphenylene ether resin synthesis. In the case of poly(2,6-dimethyl-1, 4-phenylene ether); 2,4,6-trimethylanisole, 7-methyldihydrobenzofuran, 2,3-dihydrobenzofuran, 2,6-dimethylcyclohexanone and 2-ethylhex-2-enal are commonly present. Removal of sources of volatile odoriferous amines and oxygenated species is especially important because they are detectable in human organoleptic tests even in very low quantities.

Methods are known, to those skilled in the art, for removing volatile substances from polyphenylene ether or polyphenylene ether/polystyrene resins during vented extrusion, with or without the injection of water into the melt. For example, Kasahara et al., U.S. Pat. No. 4,369,278 extrudes polyphenylene ether and rubber reinforced polystyrene in a single pass, single stage vacuum vented extruder with optional water injection; Newmark, U.S. Pat. No. 3,633,880, extrudes plastic materials, which could include polyphenylene ether, in a single pass through an extruder with multiple vents and employs a specially designed screw to compress and decompress the melt aiding devolatilization without employing water. Commonly assigned pending U.S. patent application, Ser. No. 156,046 filed Feb. 16, 1988, extrudes polyphenylene ether in a single pass single stage system using up to 15 percent water and vacuum venting. Although all three of the above-mentioned methods reduce the amount of volatile substances in the resin, none of them reduce the amount of volatile odoriferous species down to a level where such materials are hardly detectable by analytical methods thus providing that articles made from them are substantially odorless, especially in food packaging applications.

Also to be mentioned is Skidmore, U.S. Pat. No. 3,742,903 which describes multiple stage addition of a liquid under pressure where the liquid is maintained under pressure and taken off as a liquid, to separate a substantially insoluble liquid from a feed mixture containing rubber and a polymer.

Ribbing et al., U.S. Pat. No. 4,746,482, disclose degasifying a polyphenylene ether in a degasification extruder and then adding at least one additional molten polymer and blending the degasified molten polyphenylene ether and the additional molten polymer in a melting extruder.

None of the above-mentioned references teach the unexpected result of the substantial reduction of volatile compounds obtained when a second thermoplastic resin is added at a point on an extruder downstream of the addition of the polyphenylene ether and at least one stage of water injection followed by vacuum venting.

Surprisingly it has now been found that sources of volatile odoriferous amines and oxygenated species and other odoriferous compounds are substantially removed from polyphenylene ether resins blended with other thermoplastic resins by the practice of this invention. These very low odor compositions are useful in food packaging application.

Also of interest are Ives, U.S. Pat. No. 4,504,338 disclosing a vented extruder for removing acetone from polyether sulfone resins; and Brown, U.S. Pat. No. 4,806,298 which discloses inactivating and removing amino nitrogen from polyphenylene ether resins to improve impact strength by extrusion with vacuum venting.

SUMMARY OF THE INVENTION

According to the present invention there is provided a process for the reduction of volatile substances in a composition comprising: (i) a polyphenylene ether resin; and (ii) a second thermoplastic resin different than (i), the process comprising: (a) delivering a polyphenylene ether resin comprising impurities selected from toluene, volatile oxygenated species and sources of volatile odoriferous amines to an extruder; (b) melting and extruding the polyphenylene ether with at least one stage of water injection followed by vacuum venting; (c) feeding the second thermoplastic resin comprising impurities into the extruder at a point on the extruder downstream of the first stage of water injection followed by vacuum venting; (d) blending the polyphenylene ether with the second thermoplastic resin in the extruder; and (e) recovering the composition.

The water can, for example, comprise liquid water or steam. Carbon dioxide can also be used instead of water. Preferably the polyphenylene ether resin comprises poly(2,6-dimethyl-1,4-phenylene)ether, poly (2,6-dimethyl-co-2,3,6-trimethyl-1,4-phenylene)ether, or a mixture thereof, but may also comprise a functionalized polyphenylene ether wherein the functionalizing agent comprises fumaric acid, maleic anhydride, citric acid, trimellitic anhydride acid chloride or a mixture of any of the foregoing. Preferably the second thermoplastic resin comprises a polystyrene resin, a polyolefin, a polycarbonate, a polyester, a polyamide, a polyphenylene sulfide or mixtures of any of the foregoing.

Nucleating agents selected from organic or inorganic particulate materials or a mixture thereof may be added in an effective amount, preferably talc up to about 2 percent by weight of the composition. This appears to favorably induce bubble formation and thereby increase surface area during devolatilization.

Preferably the total amount of water to be injected into the extrudate is from about 1 to about 10 percent by weight of said composition, divided equally or unequally between the stages, and the pressure of the vacuum vents is set such that vapor velocity through the vent is kept below about 5-6 meters sec$^{-1}$.

BRIEF DESCRIPTION OF THE DRAWING

The drawing schematically illustrates a preferred embodiment of the present invention, depicting an extruder equipped with an upstream feedport, upstream water injection/vacuum venting stage, downstream feedport and downstream water injection/vacuum venting stage.

DETAILED DESCRIPTION OF THE INVENTION

Figure 1:
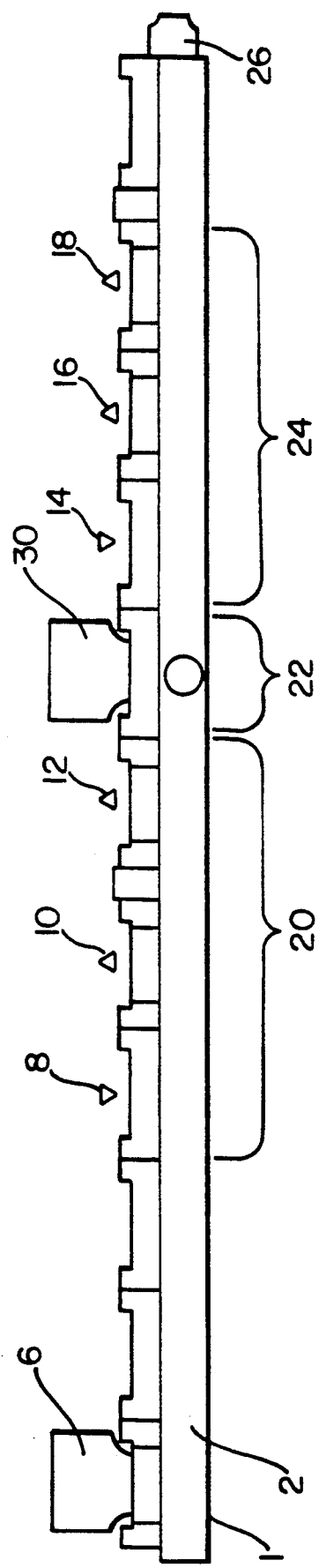

The polyphenylene ethers (also known as polyphenylene oxides) used as component (i) in the present invention are a well known class of polymers and are disclosed in Hay, U.S. Pat. Nos. 3,306,874 and 3,306,875.

The polyphenylene ethers favored for use in the practice of this invention generally contain structural units of the following formula

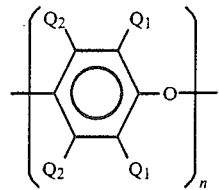

in which, independently, each $Q_1$ is hydrogen, halogen, primary or secondary lower alkyl containing up to 7 carbon atoms, phenyl, haloalkyl or amino alkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined in $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often each $Q_1$ is alkyl or phenyl, especially $C_{1-4}$ alkyl, and each $Q_2$ is hydrogen.

Both homopolymers and copolymers are included in the foregoing description. Suitable homopolymers are those containing, for example 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature including the various Hay patents. Also contemplated are graft copolymers, including those prepared by grafting onto the polyphenylene ether chain such vinyl monomers as acrylonitrile and vinyl aromatic compounds (for example, styrene) and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.30 to 0.6 deciliters per gram (dl/g) as measured in solution in chloroform at 25° C.

The polyphenylene ethers are typically prepared by the oxidative coupling of at least one corresponding monohydroxyaromatic compound. Particularly useful compounds are 2,6-xylenol (wherein each $Q_1$ is methyl and each $Q_2$ is hydrogen), whereupon the polymer may be characterized as a poly(2,6-dimethyl-1,4-phenylene ether), and 2,3,6-trimethylphenol (wherein each $Q_1$ and one $Q_2$ is methyl and the other $Q_2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, omega-hydroxyaromatic aldehydes, o-hydroxyazo compounds, beta-hydroxyoximes (monomeric and polymeric), o-hydroxyaryl oximes and beta-diketones. Also useful are known cobalt-containing catalyst systems. Suitable manganese and cobalt-containing catalyst systems for polyphenylene ether preparations are known in the art by reason of disclosure in numerous patents and publications.

The process of this invention may also be employed with functionalized polyhenylene ether. These may be prepared by the reaction of at least one functionalizing agent with a polyphenylene ether. The functionality of the functionalized polyphenylene ether may be present on the end group; for example, as a result of a reaction with the phenolic terminal hydroxy group. Functionalization may also involve one of the aromatic groups in the aromatic rings in the polymer chain, or an alkyl group attached thereto.

One method of functionalizing the polyphenylene ether is by reaction with at least one compound containing (a) a carbon-carbon double or triple bond, hydroxy group, alkoxy group, arloxy group or acyl halide group, and also (b) a carboxylic acid, acid salt, acid anhydride, acid amide, acid ester or imido group. A wide variety of such compounds are suitable for use in the present invention. Many illustrative compounds are listed in U.S. Pat. No. 4,315,086 and U.S. patent application Ser. No. 885,497 filed July 14, 1986. They include maleic, fumaric, itaconic and citraconic acids and their derivatives, various unsaturated fatty oils and the acids derived therefrom, relatively low molecular weight olefinic acids such as acrylic acid and its homologs, and the like.

Other contemplated functionalizing agents are the aliphatic polycarboxylic acids and derivatives thereof disclosed in U.S. patent application Ser. No. 736,489 filed May 20, 1985. Illustrative polycarboxylic acids of this type are citric acid, maleic acid and agaricic acid and their esters, amides and salts.

Still another class of contemplated functionalizing agents are disclosed in U.S. Pat. No. 4,600,741. Illustrative compounds within this class are carboxymethylsuccinic anhydride acid chloride and trimellitic anhydride acid chloride (TAAC).

The present invention includes resin compositions comprising a second thermoplastic resin (ii) in addition to the polyphenylene ether resin. Preferred second thermoplastic resins are the polystyrene resins. Polystyrene resins are generally added to the polyphenylene ether resin in order to improve the processability of the resin.

The polystyrene resins are broadly defined herein and based at least in part from compounds of the formula

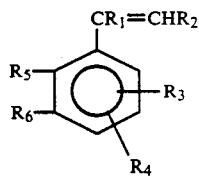

wherein $R_1$ and $R_2$ are selected from the group consisting of lower alkyl or alkenyl groups of from 1 to 6 carbon atoms and hydrogen; $R_3$ and $R_4$ are selected from a group consisting of chloro, bromo, hydrogen and lower alkyl groups of from 1 to 6 carbon atoms, $R_5$ and $R_6$ are selected from a group consisting of hydrogen and lower alkyl and alkenyl groups of from 1 to 6 carbon atoms or $R_5$ and $R_6$ may be concatenated together with hydrocarbonyl groups to form a naphthyl group.

Compounds within the above formula include styrene and its homologs and analogs. In addition to styrene, examples include alpha-methyl styrene, paramethyl styrene, 2,4-dimethyl styrene, chlorostyrene, dichlorostyrene, bromostyrene, dibromostyrene, p-tert-butyl styrene, p-ethylstyrene, vinylxylene, divinylbenzene and vinylnaphthalene. Styrene is especially preferred.

Also contemplated for use in the present invention are rubber modified polystyrenes, including high impact polystyrenes generally known as HIPS. In general, these modified polystyrene resins are made by adding rubber or rubber precursors, such as dienes, polydienes, olefin rubbers, acrylonitrile rubbers, acrylic rubbers and the like, during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPD) rubbers, styrene-butadiene copolymers (SBR), polyacrylates, polynitriles, mixtures thereof and the like.

The amount of rubber employed will vary, depending on such factors as the process of manufacture and individual requirements.

Included within this family of materials for purposes of this invention are more recently developed forms in which such factors as the rubber particle size, the gel and cis contents of the rubber phase, and the rubber volume percent are regulated or controlled to achieve improvements in impact resistance and other properties. These kinds of rubber modified polystyrenes and HIPS are described in the patent literature, including Katchman and Lee, U.S. Pat. No. 4,128,602 and Cooper and Katchman, U.S. Pat. No. 4,528,327.

Also contemplated as suitable for use herein are rubber modified polystyrenes and HIPS having morphological forms which are sometimes referred to as coreshell, comprising particles of rubber encapsulated polystyrene dispersed in a matrix of polystyrene resin. Examples of this type are disclosed in Bennett and Lee, U.S. Pat. No. 4,513,120 as well as the above-mentioned U.S. Pat. No. 4,528,327.

Polyphenylene ether (PPE) resins and polystyrene (PS) resins are combinable in all proportions, e.g., from about 1 to about 99 parts by weight polyphenylene ether and from about 99 to about 1 part by weight polystyrene. It is contemplated, however, that low density compositions of the present invention are comprised of at least 2 weight percent PPE, based upon the weight of PPE and PS taken together. Compositions containing less than 2 weight PPE are considered to be primarily polystyrene compositions and do not generally exhibit the preferred property improvements associated with PPE/PS blends. It is well known that the addition of PPE to polystyrene resins offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 5 to 95 percent and preferably 20 to 80 percent by weight PPE and 95 to 5 percent and preferably 80 to 20 percent by weight PS based upon the weight of the two resins taken together.

It is also contemplated in the present invention to employ a variety of other second thermoplastic resins (ii).

Polycarbonate resins, suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

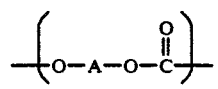

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5-dimethyl-4-hydroxyphenyl) propane; 4,4'-di-hydroxydiphenyl ether; bis(2-hydroxyphenyl)methane, mixtures thereof and the like. The preferred aromatic carbonate polymer for component (ii) is a homopolymer derived from 2,2-bis(4-hydroxyphenyl) propane(bisphenol-A).

Poly(ester carbonates) for use in the invention are known and can be obtained commercially. Generally, they are copolyesters comprising recurring carbonate groups

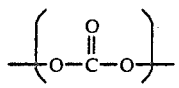

carboxylate groups

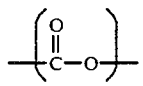

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate presursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units can range from 1:0.30–0.80:0.70–0.20 and the molar range of terephthalate units to isophthalate units can range from 9:1 to 2:8 in this preferred family of resins.

Polyesters suitable for use herein may be saturated or unsaturated or polyester elastomers and are generally derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

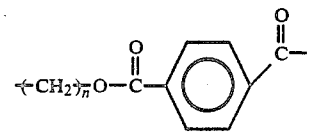

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid as to produce a polyester having recurring units of the following formula:

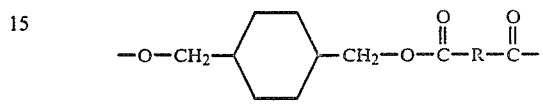

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

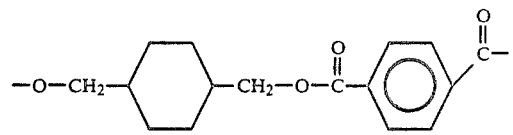

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

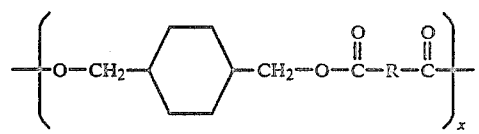

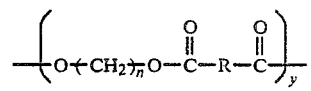

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

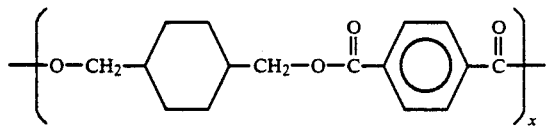

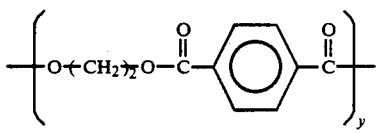

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°-30° C.

The olefinic polymers contemplated for use herein as resin (ii) in the compositions of the present invention are essentially non-elastomeric, non-rubbery, thermoplastic (that is, in the absence of a heat activated crosslinking agent) polymers usually containing at least some crystalline domains. In general, the olefinic polymer, which can be a homopolymer or copolymer, is derived from 1 or more olefins having from to to 10 carbon atoms, that is $C_2$ to $C_{10}$ olefins. Most preferred are polyethylene, polypropylene and polybutylene.

Methods for their preparation are well known. A useful reference is the Encyclopedia of Polymer Science and Technology, John Wiley and Sons, Inc. (1965-1969). The pertinent sections are set forth in Volume 6, pages 275-286 and 332-338 (polyethylene homopolymers); Volume 6, pages 338-347 (polyethylene copolymers); Volume 11, pages 597-606 (polypropylene); Volume 2, pages 759-761 (polybutylene); and Volume 9, pages 440-449 (polymers derived from higher olefins, such as 3-methyl-1-butene; 1-pentene; 4-methyl-1-pentene and 1-hexane).

Polyolefins derived from the lower olefins, especially, are readily available. Commercial processes for the production of polyethylene in particular include the use of high pressure by free radical initiation, medium pressure with transition metal oxide catalysts, and low and medium pressure processes with transition metal halides and alkyl aluminum compounds. Polyethylenes of still higher molecular weight may be produced by the well known Phillips process. Polypropylene is typically manufactured with the use of Ziegler type catalysts and an anionic reaction mechanism. Polyolefins derived from any of these sources may be used in the practice of the present invention.

The polyamides are a known family of polymeric condensation products containing recurring aromatic or aliphatic amide groups as integral parts of the main polymeric chain (such polymers are sometimes referred to as "nylons"). In general, the polyamides useful in the practice of this invention are those having linkages of the formula

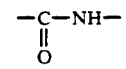

in the main chain. These include polymers formed from the condensation of diamines and dibasic acids, from the condensation of amino acids, and by the polymerization of lactams.

In general, the polyamides are obtained by polymerizing a monoaminocarboxylic acid or internal lactam thereof having at least two carbon atom between the amines and carboxylic acid groups; or by polymerizing substantially equimolar proportions of a diamine which contains at least two carbon atoms between the amino groups and a dicarboxylic acid; or by polymerizing a monoamino carboxylic acid or an internal lactam thereof together with substantially equimolar proportions of a diamine and a dicarboxylic acid. Examples of the monoamino-carboxylic acid or lactam include compounds containing from 2 to 16 carbon atoms between the amino and carboxylic acid groups (the carbon atoms forming a ring with the amide group in the case of a lactam). As particular examples, mention is made of aminocaprioic acid, butyrolactam, picalolactam, caprolactam, caprylactam, enantholactam, undecanolactom, dodecanolactam and 3-, and 3-aminobenzoic acids.

Examples of the diamine are those of the general formula $H_2N(CH_2)_nNH_2$, in which n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g., 2,2-dimethylpentamethylenediamine and 2,2,4- and 2,4,4-trimethylhexamethylenediamine, are further examples. Other diamines which may be mentioned as examples are aromatic diamines, e.g., p-phenylenediamine, 4,4'-diaminodiphenyl sulfone, 4,4'-diaminodiphenyl ether and 4,4'-diaminodicyclohexylmethane.

The dicarboxylic acids may be aromatic, for example, isophthalic and terephthalic acids. Preferred dicarboxylic acids are of the formula HOOC—Y—COOH wherein Y represents a divalent aliphatic radical containing at least 2 carbon atoms. Examples of such acids are sebacic acid, octadecanedioic acid, suberic acid, azelaic acid, undecanedioic acid, glutaric acid, pimelic acid, and especially adipic acid.

Illustratively the following polyamides may be incorporated into the thermoplastic resin blends of the invention:

Homopolymers polyhexamethylene adipamide (nylon 6,6);
polypyrrolidone (nylon 4);
polycaprolactam (nylon 6);
polyheptolactam (nylon 7);
polycaprylactam (nylon 8);
polynonanolactam (nylon 9);
polyundecanolactam (nylon 11);
polydodecanolactam (nylon 12);
polyhexamethylene azelaiamide (nylon 6,9);
polyhexametnylene sebecamide (nylon 6,10);

polyhexamethylene isophthalamide (nylon 6,ip);
polymethaxylylene adipamide (nylon MSD,6);
polyamide of hexamethylene and n-dodecanedioic acid (nylon 6,12); and
polyamide of dodecamethylene and n-dodecanedioic acid (nylon 12,12);

Copolymers hexamethylene adipamide/caprolactam (nylon 6,6/6);
hexamethylene adipamide/hexamethylene isophthalamide (nylon 6,6/6,ip);
hexamethylene adipamide/hexamethylene terephthalamide (nylon 6,6/6,tp);
trimethylhexamethylene oxamide/hexamethylene oxamide (nylon trimethyl-6,2/6,2);
hexamethylene adipamide/hexamethylene azelaiamide (nylon 6,6/6,9); and
hexamethylene adipamide/hexamethylene azelaimide caprolactam (nylon 6,6/6,9/6); and
hexamethylene adipamide/hexamethylene azelaiamide caprolactam (nylon 6,6/6,9/6).

The average molecular weight of the polyamide used in the compositions of this invention can range from about 1,000 to about 20,000 or higher (number average).

Special mention is made herein of the preferred polyamides known as nylon 6 (a polycaprolactam) and nylon 6,6 (a polyhexamethylene adipamide).

The polyphenylene sulfides contemplated for use herein as resin (ii) are generally a crystalline aromatic polymer in which recurring benzene rings are para-substituted with sulfur atom links. Generally they are of the formula

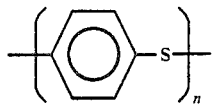

The polyphenylene sulfide resins are available commercially and described more fully in the literature. (See Modern Plastics Encyclopedia, '89, McGraw Hill, October 1988, Vol. 65, No. 11, pp 84-86).

It is also contemplated in the present invention to add an effective amount of an organic or inorganic particulate material as a nucleating agent to the resin composition to induce bubble formation and increase surface area during devolatilization. One can use ground glass, carbon black, talc, and the like. Preferably the nucleating agent comprises talc in an amount of up to about 2 percent by weight based on said resin composition.

An essential step in the method of this invention is initially extruding the polyphenylene ether composition alone, or optionally with a relatively minor portion of resin (ii), in the upstream portion of the extruder barrel. Extrusion may be conducted using any known equipment for this operation, including single-screw and twin-screw extruders. See, for example, Modern Plastics Encyclopedia/89, October 1988, McGraw Hill, N.Y., p. 242-244. Especially suitable for amine removal is a co-rotating twin screw extruder. Since a second thermoplastic resin is also to be added downstream of the polyphenylene ether resin, the extruder equipped with a suitable port for feeding the second thermoplastic resin at a point downstream of the polyphenylene ether resin feed port and at least the first stage of water injection followed by vacuum venting.

Since multiple stages of water injection and vacuum venting are also essential features of this invention, the presence of suitable ports in the extruder for injection of a stripping agent and vents for vacuum venting are mandatory. The stripping agent may be introduced at any point upstream of the first vent or set of vents; however, it is highly preferred to introduce the stripping agent through a port located at a point in the extruder where the polymer composition has been converted into a fully developed polymer melt, since this facilitates intimate contact with the polymer.

Water or steam are the preferred stripping agents, and the proportion employed is up to about 15 percent by weight of the polymer composition, to be divided equally, or unequally, among the two or more injection ports located along the length of the extruder barrel. The preferred proportion is from about 0.25 to about 15 weight percent, since an amount within this range is generally very effective for removal of volatiles without burdening the vacuum system. Most preferred is from 0.5 to about 5 weight percent. For example, where two injection ports are present and about 5 percent total water by weight of polymer composition is to be used, each injection port would inject about 2½ percent of the water into the extrudate.

The degree of vacuum will depend on several factors, including the proportion of volatile impurities in the polyphenylene ether or polyphenylene ether/second thermoplastic resin and the amount of water to be employed. In general, it is preferable to limit the vapor velocity across the vent interface to about 5-6 meters sec$^{-1}$ and the pressure should be set accordingly.

In most instances, maximum or near maximum rate of rotation of the extruder screw or screws should be maintained for effective volatilization. The rotation rate will to some extent be dependent on the equipment used, but values in the range of about 300 to about 500 revolutions per minute are generally sufficient.

Referring to the drawing, extruder 1 comprises a heated barrel 2 and a multi-flight screw adapted to co-rotate with a twin screw (not shown). Feed hopper 6 located at the upstream end is adapted to receive the polyphenylene ether resin, and conventional additives and if desired a nucleating agent, such as talc. As the resin is transported downstream it is heated and melted. Preferably the melt temperature of the polyphenylene ether during the heating and melting stage is above about 280° C. The resin melt then encounters stage 20 comprising water injection port 8 and vacuum vents 10 and 12. The resin melt which exits stage 20 then encounters stage 22 comprising a feed port 30 for the addition of a second thermoplastic resin. The polyphenylene ether and second thermoplastic resin are then melt blended. The melt blend then encounters stage 24 comprising water injection port 14 and vacuum vents 16 and 18. Finally the material exits the extruder at front barrel outlet 26. The exiting product can be extruded into shapes or cut into pellets for further processing in accordance with conventional techniques.

Other embodiments of the process of the present invention, include shaping the low odor composition into pellets, solid sheets, foamed sheets or boards, molded or extruded articles and the like.

Any conventional hot or cold pelletizing or dicing systems may be used to form pellets. Cold cutting systems are generally dicing, strand pelletizing and strand (forced conveyance) pelletizing systems. Hot cutting systems generally comprise water ring pelletizers, hot face pelletizers, underwater pelletizers and centifuged pelletizers. See generally Modern Plastics Encyclopedia/89, McGraw-Hill, October 1988, p. 352. Solid sheets are generally formed by extending the molten composition through dies specially suited for forming solid sheets, such as flat sheet dies, although any die which will produce a solid sheet may be employed. See generally, Modern Plastics Encyclopedia/89, McGraw Hill, October 1988, pp. 224-248. Extruded or molded articles may be produced in any conventional process and apparatus known to those skilled in the art.

Optionally, the low odor composition may be foam processed. Any suitable apparatus for extruding foamed sheets or boards may be employed in this shaping process. See for example, Modern Plastics Encyclopedia/89, McGraw Hill, October, 1988, pp 254-258. Especially suitable for the practice of the present invention are tandem extruders. The resin composition is fed into a first mixing-melting single or twin screw type extruder and melted and mixed therein with a liquid blowing agent at sufficient temperature and shear to provide an intimate blend.

During the blending step it is also contemplated to introduce conventional additives into the polymer composition flame retardants, thermal and color stabilizers, antioxidants, processing aids, plasticizers, reinforcing and extending fillers, pigments, dyes and the like. Each of these may be utilized to a greater or lesser degree depending on the desired final properties of the foamed product. Conventional surfactants and nucleants may also be utilized, such as zinc or tin stearates, maleates and fumarates.

Suitable nucleating agents, which aid in controlling the foam cell size and number of foam cells, usually comprise a fine powder such as talc or a combination of citric acid and bicarbonate of soda.

The blowing agents may include conventional hydrocarbon or fluorocarbon blowing agents. The preferred hydrocarbon blowing agents will include aliphatic hydrocarbons. Examples include propane, butane, isobutane, n-pentane, isopentane, neopentane, pentene, cyclopentane, hexane, heptane, octane, mixtures thereof and the like. Fluorocarbon blowing agents include trichlorofluoromethane ($CCl_3F$), dichlorodifluoromethane ($CCl_2F_2$), difluorochloromethane (HCFC-22) ($CHClF_2$) and $CClF_2$-$CClF_2$. These are commercially available as FREON® 11, FREON® 12, FORMACEL®S and FREON® 114. Other halogenated hydrocarbon blowing agents include methylene chloride, chloroform, carbon tetrachloride ($CCl_4$), HCFC's such as dichlorotrifluoroethane (HCFC-123) ($CHCl_2CF_3$), dichlorotrifluoroethane (HCFC-123A) ($CHFClCClF_2$), chlorotetrafluoroethane (HCFC-124) ($CHClFCF_3$), tetrafluoroethane (HFC-134A) ($CH_2FCF_3$), dichlorofluoroethane (HCFC-141B) ($CCl_2FCH_3$), chlorodifluoroethane (HCFC-142B) ($CH_3CClF_2$), difluoroethane (HFC-152A) ($CH_3CHF_2$) the like. Other blowing agents contemplated for use in the present invention are: acetone, alcohols having from 1 to 5 carbon atoms such as isopropanol, halogenated alcohols such as fluoroisopropanol, carbon dioxide, nitrogen, water, methylethyl ketone, ethyl acetate or mixtures of any of the foregoing.

Although the extrudate can be foamed through a die in the first extruder, preferably the extrudate is transferred through a pressurized closed conduit to a second single or twin screw extruder.

The conduit should be heated to maintain melt consistency. In the second extruder, the melt is cooled and exits as a foam at a die located at the downstream end of the extruder barrel.

As an alternative, the blowing agent can also be introduced into the devolatilizing extruder to obtain a melt which contains the liquid blowing agent under pressure. This material can be foamed directly out a die at the downstream end of the devolatilizing extruder or may be transferred to single or tandem foam extruders for foaming.

Also contemplated by the present invention is combining the low odor composition of the present invention with let-down resins, including polyphenylene ether resins, prior to further processing or shaping. Resins such as a polystyrene, a rubber modified polystyrene, copolymers of styrene and acrylonitrile, a poly(butylene terephthalate), a poly(bisphenol-A carbonate), a poly(etherimide ester), a poly(ester carbonate), a polyamide resin, ABS resins, and the like, or a mixture of any of them can be used as let-down resins.

DESCRIPTION OF PREFERRED EMBODIMENTS

The following examples illustrate the present invention. They are not to be construed to limit the claims in any manner whatsoever.

EXAMPLES 1-5

A poly(2,6-dimethyl-1,4-phenylene)ether (PPE) is fed into the upstream feedport of an 83 mm Werner Pfleiderer twin screw extruder equipped with an upstream feedport, an upstream water injection/vacuum venting system, a downstream feed port and a downstream vacuum venting system screw design. The PPE is melted, water is injected, combined with the melt and subsequently removed through two wide open vacuum vent ports. A high impact rubber modified polystyrene is then fed into the extruder through the downstream feedport, compounded with the PPE, and the residual volatiles are removed through a vacuum vent port before the blend is pumped through the die. The extrudate is then tested for nitrogen, styrene monomer and toluene. For comparison purposes, PPE/polystyrene blends were devolatilized with a two-stage stream-stripping process, with both a normal and a mild screw design. The results are set forth in Table I below.

TABLE 1

| Example | A* | B* | C* | D* | E* | 1 | 2 | 3 | 4 | 5 |
|---|---|---|---|---|---|---|---|---|---|---|
| Processing Data | | | | | | | | | | |
| Process | $C_1$ | $C_1$ | $C_2$ | $C_2$ | $C_2$ | B | B | B | B | B |
| PS | X | X | X | X | X | X | X | HIPS | HIPS | X |
| Rate, lbs/hr | 700 | 700 | 700 | 700 | 500 | 800 | 800 | 800 | 800 | 500 |
| Barrel Set, °C. | 288 | 288 | 288 | 288 | 288 | 260 | 227 | 260 | 288 | 260 |
| Melt Temp., °C. | 362 | 358 | 355 | 360 | 380 | 347 | 341 | 353 | 350 | 376 |
| Water Rate 1 wt % | 1.5 | 3 | 1.5 | 3 | 3 | 4 | 2 | 4 | 4 | 4 |
| Water Rate 2 | 1.5 | 3 | 1.5 | 3 | 3 | 0 | 0 | 0 | 0 | 0 |

TABLE 1-continued

| Example | A* | B* | C* | D* | E* | 1 | 2 | 3 | 4 | 5 |
|---|---|---|---|---|---|---|---|---|---|---|
| wt % | | | | | | | | | | |
| Results | | | | | | | | | | |
| Nitrogen, ppm | 142 | 150 | 163 | 163 | 195 | 131 | 153 | 128 | 130 | 199 |
| Styrene, ppm | 639 | 542 | 555 | 647 | 918 | 384 | 337 | 416 | 431 | 797 |
| Toluene, ppm | 83 | 75 | 122 | 129 | 182 | 100 | 114 | 64 | 72 | 212 |

*Comparative Example
$C_1$ = normal stripping screw
$C_2$ = mild screw design
B = downstream addition of polystyrene
PS = polystyrene
X = principally atactic polystyrene 50 parts by weight
$X_1$ = principally atactic polystyrene, 20 parts by weight
HIPS = high impact polystyrene, 50 parts by weight
ppm = parts per million It can be seen from Table 1 above that the process of the present invention results in a moderate reduction in the melt temperature and provides an unexpectedly vast reduction in styrene monomer concentration and concentration of other volatiles in the extrudate in comparison with the upstream addition processes. The downstream process however is not seen to provide a significant benefit for high-end blends (80 parts PPE/20 parts PPS). The amount of material fed downstream is not enough to quench the melt temperature and as a result styrene monomer concentration is high.

EXAMPLES 6-7

The procedure of Example 1 is repeated except Mobil 5600 of high impact polystyrene is employed. The results are set forth in Table 2 below.

TABLE 2

| | Example | | | |
|---|---|---|---|---|
| Processing | A* | B* | 6 | 7 |
| Conditions | | | | |
| Process | A1 | A1 | B1 | B1 |
| Material | M50 | M50 | M50 | M50 |
| Rate, lbs/hr | 800 | 800 | 800 | 800 |
| 1200 | | | | |
| Melt Temp. °C. | 358 | 364 | 330 | 339 |
| Water, wt % | 2.2 | 2.2 | 3.0 | 3.0 |
| Vacuum, mbar | 21 | 28 | 28 | 21 |
| Volatiles (ppm) | | | | |
| Nitrogen | 233 | 219 | 143 | 156 |
| Toluene | 264 | 188 | 69 | 115 |
| Styrene | 691 | 623 | 420 | 442 |
| E Benzene | 16 | 10 | 0 | 10 |
| TMA | 4 | 3 | 0 | 0 |
| 7MDHBF | 1 | 0 | 0 | 0 |
| 23 DHBF | 18 | 0 | 0 | 4 |
| DMCH | 15 | 10 | 0 | 6 |

A1 = all materials upstream, normal screw design
B1 = HIPS added downstream wherein 25 parts of HIPS fed upstream, 50 parts downstream
M = Mobil 5600 HIPS
ppm = parts per million
E Benzene = ethyl benzene
TMA = 2,4,6-trimethylanisole
7MDHBF = 7-methyl dihydrobenzofuran
23DHBF = 2,3-dihydrobenzofuran
DMCH = dimethylcyclohexane
All runs at 350 rpm screw speed, 288° C. barrel setpoints and 316° C. die set point It can be seen from Table 2 above that downstream process (B1) is the best for removing PPE related volatiles and minimizing polystyrene degradation.

Table 3 above demonstrates the surprising reduction in volatiles obtained using the process of the present invention and the excellent physical properties of the resultant resin blends.

EXAMPLE 8

The procedure of Example 1 is followed except a 53 mm Werner Pfleiderer extruder equipped with a downstream water injection/vacuum venting stage is employed. For comparative purposes a test run without the downstream stage is also made.

TABLE 3

| Example | 8 | 8 |
|---|---|---|
| Downstream | No | Yes |
| Volatiles, ppm | | |
| Butanal | 118 | 45 |
| Toluene | 35 | 21 |
| Ethyl Benzene | 12 | 5 |
| Nitrogen | 163 | 131 |
| Styrene | 804 | 434 |

*Comparative Example

Table 3 demonstrates that surprisingly an even further reduction in volatile compounds can be obtained by employing a downstream water injection/vacuum venting stage.

EXAMPLES 9-17

The procedure of Example 1 is repeated except that instead of adding a polystyrene resin downstream, a variety of other thermoplastic resins are employed: a polyethylene, a polypropylene, a linear low density polyethylene, a poly(bisphenol-A) carbonate, a polyethylene terephthalate, a poly(1,4-butylene terephthalate), a polybutylene terephthalate-polycarbonate blend, a nylon-6,6 and a polyphenylene sulfide. In all instances a significant reduction in the amount of volatiles in the product resin results.

The above-mentioned patents, patent applications and publications as well as test methods are incorporated herein by reference.

Many variations of the present invention will suggest themselves to those skilled in the art in light of the above detailed description. For example, instead of polyphenylene ether in Example 1, a mixture of 100 parts of polyphenylene ether and 0.7 parts of fumaric acid can be fed into the upstream feed port and a polyamide can be fed into the downstream feed port to produce a functionalized polyphenylene ether-polyamide blend having a very low odor. Instead of poly(2,6-dimethyl-1,4-phenylene)ether, a poly(2,6-di-methyl-co-2,3, 6-trimethyl-1,4-phenylene)ether can be used. Additionally more than one upstream water injection/vacuum venting stage may be employed and/or more than one downstream water injection/vacuum venting stage. Steam or carbon dioxide may also be used instead of liquid water. It is also contemplated to add a nucleant such as talc in the upstream feed and/or a variety of other commercial additives. All such obvious modifications are within the full intended scope of the appended claims.

We claim:

1. A process for the reduction of volatile substances in a composition comprising:
   (i) a polyphenylene ether resin; and
   (ii) a polystyrene resin
   said process comprising:
   (a) delivering a polyphenylene ether resin comprising impurities selected from toluene, volatile oxygenated species, and sources of volatile odoriferous amines to an extruder;
   (b) melting and extruding said polyphenylene ether with at least one stage of water injection followed by vacuum venting;
   (c) feeding said polystyrene resin (ii) into said extruder at a point on the extruder downstream of the first stage of water injection followed by vacuum venting;
   (d) blending the polyphenylene ether and styrene resins in the extruder; and
   (e) recovering said composition.

2. A process as defined in claim 1 wherein said polyphenylene ether resin (i) comprises poly(2,6-dimethyl-1,4-phenylene)ether, poly(2,3,6-trimethyl-1,4-phenylene)ether, or poly(2,6-dimethyl-co-2,3,6-trimethyl-1,4-phenylene)ether.

3. A process as defined in claim 2 wherein said polyphenylene ether resin (i) comprises poly(2,6-dimethyl-1,4-phenylene)ether.

4. A process as defined in claim 1 wherein said component (ii) is selected from the group consisting of a polyolefin, a polycarbonate, a polyester, a polyamide, a polyphenylene sulfide and a mixture of any of the foregoing.

5. A process as defined in claim 1 wherein said polystyrene resin comprises principally atactic polystyrene.

6. A process as defined in claim 1 wherein said polystyrene resin comprises a rubber modified styrene polymer.

7. A process as defined in claim 4 wherein said polycarbonate comprises poly(bisphenol-A) carbonate.

8. A process as defined in claim 4 wherein said polyester comprises poly(ethylene terephthalate), poly(1,4-butylene terephthalate) or a mixture thereof.

9. A process as defined in claim 4 wherein said thermoplastic resin comprises a mixture of a polycarbonate and a polyester.

10. A process as defined in claim 1 wherein said polyphenylene ether resin (i) comprises a functionalized polyphenylene ether.

11. A process as defined in claim 10 wherein the functionalizing agent is selected from the group consisting of fumaric acid, maleic anhydride, citric acid, trimellitic anhydride acid chloride and mixtures of any of the foregoing.

12. A process as defined in claim 4 wherein said component (ii) is comprises a polyamide resin.

13. A process as defined in claim 1 wherein effective amounts of additives selected from the group consisting of impact modifiers, flame retardants, stabilizers for thermal and color stability, antioxidants, pigments, process aids, plasticizers, reinforcing and extending fillers, antistatic agents, lubricants and mixtures of any of the foregoing are also added in step (a).

14. A process as defined in claim 1 wherein during step (b) the temperature in the extruder is above about 280° C.

15. A process as defined in claim 1 wherein during step (d) the melt temperature of the two resins is less than about 350° C.

16. A process as defined in claim 1 wherein in step (b) there are two stages of water injection followed by vacuum venting.

17. A process as defined in claim 1 wherein the water injected in step (b) is liquid water or steam.

18. A process as defined in claim 1 wherein in step (b) the total amount of water injected is from about 0.25 to about 15 percent by weight of the polyphenylene ether resin.

19. A process as defined in claim 1 wherein in step (b) the total amount of water injected is from about 0.5 to about 5 percent by weight of the polyphenylene ether resin.

20. A process as defined in claim 1 wherein the pressure during extrusion is in the range of from about 550 to about 720 torr.

21. A process as defined in claim 1 wherein an effective amount of a nucleating agent selected from an organic or inorganic particulate material thereof is added to the composition to induce bubble formation and increase surface area during devolatilization.

22. A process as defined in claim 21 wherein said nucleating agent comprises talc in an amount of up to about 2 percent by weight based on said composition.

23. A process as defined in claim 1 including in step (b) injecting carbon dioxide into the extruder in at least one injection followed by vacuum venting stage.

24. A process as defined in claim 1 including setting the vacuum vent pressure such that the vapor velocity through the vent or vents is kept below about 5–6 meter $sec^{-1}$.

25. A process as defined in claim 1 wherein said composition comprises from about 2 to about 98 parts by weight polyphenylene ether resin and from about 98 to about 2 parts by weight polystyrene resin based on the weight of the two resins combined.

26. A process as defined in claim 25 wherein said composition comprises from about 20 to about 80 parts by weight polyphenylene ether resin and from about 80 to about 20 parts by weight polystyrene resin based on the weight of the two resins combined.

27. A process as defined in claim 26 wherein said composition comprises about 50 parts by weight polyphenylene ether resin and about 50 parts by weight polystyrene resin based on the weight of the two resins combined.

28. A process as defined in claim 1 wherein step (c) further comprises at least one stage of water injection followed by vacuum venting.

29. A process as defined in claim 28 wherein said water comprises liquid water or steam.

30. A process as defined in claim 28 wherein the amount of water injected in step (c) is from about 1 to about 10 percent by weight of the two resins.

31. A process as defined in claim 28 including injecting carbon dioxide into the extruder in at least one injection followed by vacuum venting stage in step (c).

32. A process as defined in claim 28 including setting the vacuum vent pressure of step (c) such that the vapor velocity through the vent or vents is kept below about 5–6 meter $sec^{-1}$.

33. A process as defined in claim 1 wherein a relatively minor portion of the polystyrene resin (ii) is added in step (a).

34. A process as defined in claim 1 wherein said extruder is a single or twin screw extruder.

35. A process as defined in claim 1 wherein step (e) further comprises shaping the low odor composition.

36. A process as defined in claim 35 wherein said step (e) further comprises pelletizing said low odor composition.

37. A process as defined in claim 35 wherein said step (e) comprises foaming said low odor composition.

38. A process as defined in claim 35 wherein said step (e) further comprises extruding said composition through a die to form a solid sheet having very low odor in human organoleptic tests.

39. A process as defined in claim 37 wherein said composition comprises a foamed sheet or board having very low odor in human organoleptic tests.

40. A process as defined in claim 35 wherein said step (e) further comprises extruding said composition through a die to form an extruded article having very low odor in human organoleptic tests.

41. A process as defined in claim 35 wherein said step (e) further comprises molding said composition to form a molded article having very low odor in human organoleptic tests.

42. A low odor polyphenylene ether/polystyrene pellet produced by the process as defined in claim 35.

43. A low odor polyphenylene ether/polystyrene foamed sheet or board produced by the process as defined in claim 39.

44. A low odor polyphenylene ether/polystyrene solid sheet produced by the process as defined in claim 38.

45. A low odor polyphenylene ether/polystyrene extruded article produced by the process as defined in claim 40.

46. A low odor polyphenylene/polystyrene molded article produced by the process as defined in claim 41.

* * * * *